F. M. COWGILL.
ROLLER BEARING FOR CAR WHEELS.
APPLICATION FILED JULY 29, 1919.
1,334,018.
Patented Mar. 16, 1920.
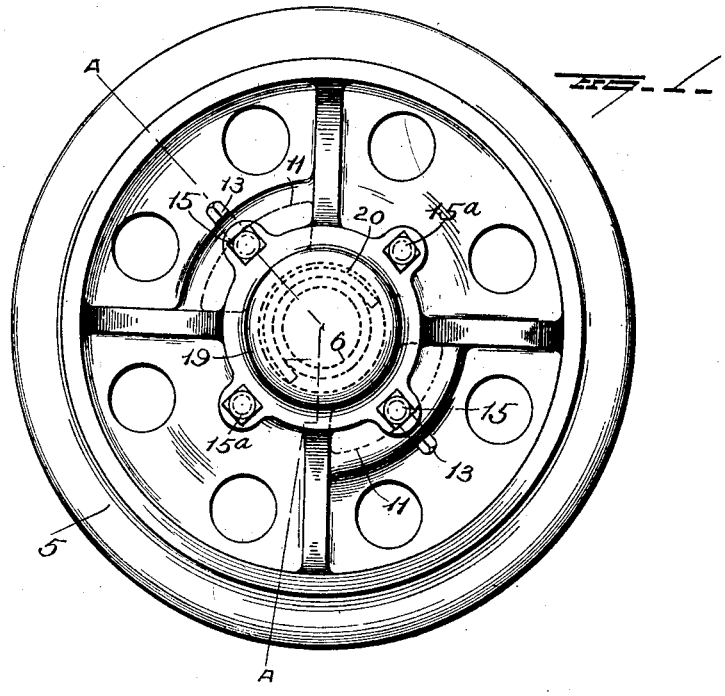
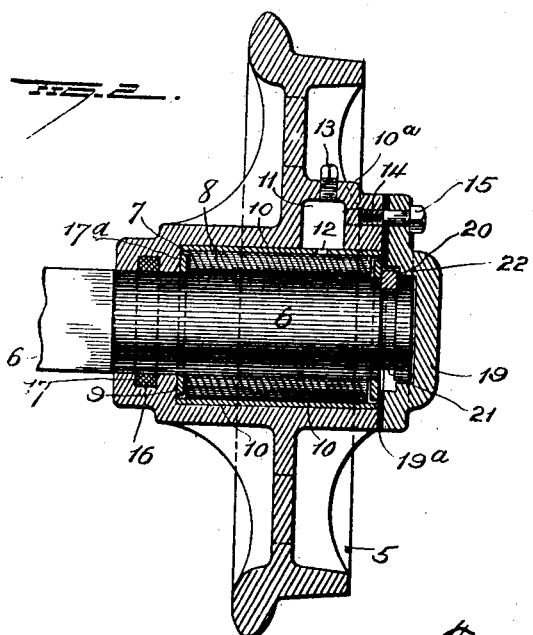

UNITED STATES PATENT OFFICE.

FRANK M. COWGILL, OF COLUMBUS, OHIO, ASSIGNOR TO THE RALSTON STEEL CAR COMPANY, OF COLUMBUS, OHIO.

ROLLER-BEARING FOR CAR-WHEELS.

1,334,018.  Specification of Letters Patent.  Patented Mar. 16, 1920.

Application filed July 29, 1919. Serial No. 314,088.

*To all whom it may concern:*

Be it known that I, FRANK M. COWGILL, a citizen of the United States, and a resident of Columbus, in the county of Franklin and State of Ohio, have invented certain new and useful Improvements in Roller-Bearings for Car-Wheels; and I do hereby declare the following to be a full, clear, and exact description of the invention, such as will enable others skilled in the art to which it appertains to make and use the same.

This invention relates to an improvement in roller bearings for car wheels and particularly wheels designed for use on mine cars, the object being to provide improved means for mounting and detachably securing the wheel on a stationary axle, and also for lubricating the bearing, and it consists in the details of construction as will be more fully explained and pointed out in the claim.

In the accompanying drawings; Figure 1 is a view in elevation of a wheel embodying my invention, and Fig. 2 is a view in section on the line A—A of Fig. 1 of the wheel showing it applied to an axle, the latter being in elevation.

5 represents a car wheel, the hub of which is bored to receive the axle 6 and counterbored as at 7 for the cylindrical rollers 8. These rollers 8 are preferably connected at their ends by the rings 9 which hold them in proper relative position, and the counterbore 7 is provided with the lining 10 against which the rollers have direct bearing. The hub of the wheel is provided at diametrically opposite points with integral hollow enlargements 10$^a$, the chambers or cavities 11 of which constitute oil or lubricant reservoirs which communicate with the counterbore of the hub, the lining 7 which forms a partition between the said cavities and the counterbore, having holes 12 through the same for the passage of the lubricant to the rollers 8 and axle 6.

Oil or other lubricant is supplied to the lubricant chambers 11 through holes closed by the screw plugs 13, or if desired the threaded holes 14 for the screw bolts 15 may be continued into the said chambers, as shown by dotted lines in Fig. 2, and constitute the filling openings for the said chambers.

The rear end of the hub is grooved as at 16 for the reception of the felt or other packing ring 17 which operates to prevent the escape of the lubricant outwardly along the axle, and also prevents the entrance of dust or dirt into the interior of the hub, and the outer end of said hub is closed by the cap 19 secured in place by the screw bolts 15 and 15$^a$, a soft metal, preferably lead, gasket 19$^a$ being interposed between the end of said hub and the cap to prevent the leakage of lubricant.

The cap 19 is recessed at its inner side to receive the outer end of the axle 6, and also the locking yoke 20, which latter is U-shape as shown in dotted lines in Fig. 2, and rests in the peripheral groove 21 formed in the axle adjacent the outer end of the latter. This yoke 20 is housed in the cap 19 and is held against displacement by the latter and projects beyond the periphery of the axles, and between the shoulder 22 on cap 19 and end ring 9 of rollers 8, and takes end thrust of the axle in the wheel and detachably locks the wheel to the axle, without interfering in the slightest with the free rotation of the wheel on the axle. The rollers 8 have end bearing against the end wall 17$^a$ of the counterbore in the hub and against the inner face of the cap 19, and may be readily and quicker gotten at for inspection or for repairs by removing the cap 19.

With this construction the bore of the hub forms in effect a lubricant chamber completely sealed against the escape of lubricant and the entrance of dust.

To get at the parts for inspection and repair, it is simply necessary to remove the cap 19 and yoke 20, which leaves the wheel and its roller bearings free to be withdrawn from the end of the axle. When the parts are in place the end of the axle carrying the wheel is completely protected by the latter, and the leakage of lubricant or the entrance of dust between the axle and the wheel bearing absolutely prevented.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters-Patent, is:—

The combination of an axle having a peripheral groove adjacent its outer end, a car wheel the bore of which is counterbored from its outer end and provided with a peripheral groove adjacent its inner end, a packing within said groove and embracing the axle, roller bearings within the counterbore and around the axle, a key removably seated in the peripheral groove in the axle and projecting outwardly beyond the latter and a detachable cap secured to the hub and closing the outer end of the bore of the latter, the said cap forming an abutment for the key.

In testimony whereof, I have signed this specification in the presence of two subscribing witnesses.

FRANK M. COWGILL.

Witnesses:
H. A. WILFORD,
R. C. MONTGOMERY.